US 6,549,258 B1

(12) United States Patent
Shin et al.

(10) Patent No.: US 6,549,258 B1
(45) Date of Patent: *Apr. 15, 2003

(54) HYBRID SWITCHING MODE LIQUID CRYSTAL DISPLAY DEVICE

(75) Inventors: Hyun Ho Shin, Kyungki-do (KR); Jong Jin Park, Seoul (KR); Wook Sung Kim, Kyungki-do (KR)

(73) Assignee: LG. Philips LCD Co., Ltd., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/143,624

(22) Filed: Aug. 28, 1998

(30) Foreign Application Priority Data

| Sep. 4, 1997 | (KR) | 97-45836 |
| Sep. 4, 1997 | (KR) | 97-45837 |
| Mar. 16, 1998 | (KR) | 98-8736 |

(51) Int. Cl.$^7$ .................................. G02F 1/1343
(52) U.S. Cl. .......................... 349/141; 349/143
(58) Field of Search .......................... 349/141, 143, 349/139, 130

(56) References Cited

U.S. PATENT DOCUMENTS

| 4,239,346 A | 12/1980 | Lloyd .................. 350/334 |
| 4,726,659 A | 2/1988 | Conrad et al. .......... 350/341 |
| 5,307,189 A | * 4/1994 | Nishiski et al. ......... 349/143 |
| 5,321,535 A | 6/1994 | Ukai et al. ............. 349/42 |
| 5,459,596 A | 10/1995 | Ueda et al. ............. 349/42 |

(List continued on next page.)

FOREIGN PATENT DOCUMENTS

| EP | 0 368 260 | 5/1990 |
| EP | 0588568 A3 | 3/1994 |
| EP | 0588568 | 3/1994 |
| EP | 0 749 029 | 12/1996 |
| JP | 53-48542 | * 5/1978 |

(List continued on next page.)

OTHER PUBLICATIONS

Oh–e, M., M. Ohta, S. Aratani, K. Kondo, "Principles and Characteristics of Electro–Optical Behavior with In–Plane Switching Mode," *Asia Display '95*, pp. 177–180.

Ohta, M., M. Oh–e, K. Kondo, "Development of Super–T-FT–LCDs with In–Plane Switching Display Mode," *Asia Display '95*, pp. 707–710.

Kiefer, R., B. Weber, F. Windscheid, G. Baur, "In–Plane Switching of Nematic Liquid Crystals," *Japan Display '92*, pp. 547–550.

Euro Display '96, "Display Characteristics of In–Plane Switching (IPS) LCDs and a Wide–Viewing–Angle 14.5–in. IPS TFT–LCD," A. Matsumoto, S. Seyama, Y. Ukai, T. Unate, M. Moriya, T. Inada and K. Saigusa, pp:445–448.

SID 97 Digest, "An Advanced In–Plane Switching Mode TFT–LCD," H. Wakemoto, S. Asada, N. Kato, Y. Yamamoto, M. Tsukane, T. Tsurugi, K. Tsuda and Y. Takubo, pp:929–932.

(List continued on next page.)

*Primary Examiner*—James Dudek
*Assistant Examiner*—Dung Nguyen
(74) *Attorney, Agent, or Firm*—McKenna Long & Aldridge LLP

(57) ABSTRACT

A hybrid switching mode liquid crystal display device includes first and second substrates and a liquid crystal layer between the first and second substrates. A plurality of first electrodes are formed on the first substrate and applies an in-plane electric field. A plurality of second electrodes are formed on the second substrate and applies perpendicular and inclined electric fields with the first electrodes.

36 Claims, 4 Drawing Sheets

U.S. PATENT DOCUMENTS

| | | | | |
|---|---|---|---|---|
| 5,464,669 A | | 11/1995 | Kang et al. | 428/1 |
| 5,492,762 A | | 2/1996 | Hirai et al. | 428/447 |
| 5,576,858 A | | 11/1996 | Ukai et al. | 349/42 |
| 5,598,285 A | | 1/1997 | Kondo et al. | 349/39 |
| 5,600,464 A | | 2/1997 | Ohe et al. | 349/123 |
| 5,602,662 A | | 2/1997 | Rosenblatt et al. | 349/130 |
| 5,608,556 A | | 3/1997 | Komo | 349/143 |
| 5,646,705 A | | 7/1997 | Higuchi et al. | 349/743 |
| 5,686,019 A | | 11/1997 | Nakamura | 349/133 |
| 5,737,051 A | | 4/1998 | Kondo et al. | 349/141 |
| 5,742,369 A | | 4/1998 | Mihara et al. | 349/123 |
| 5,745,207 A | | 4/1998 | Asada et al. | 349/141 |
| 5,757,455 A | * | 5/1998 | Sugiyama et al. | 349/130 |
| 5,760,856 A | | 6/1998 | Yamagawa et al. | 349/42 |
| 5,760,857 A | | 6/1998 | Yanagawa et al. | 349/141 |
| 5,781,261 A | | 7/1998 | Ohta et al. | 349/111 |
| 5,786,876 A | | 7/1998 | Ota et al. | 349/42 |
| 5,793,459 A | | 8/1998 | Toko | 349/128 |
| 5,818,560 A | | 10/1998 | Kouno et al. | 349/129 |
| 5,831,701 A | | 11/1998 | Matsuyama et al. | 349/110 |
| 5,841,499 A | | 11/1998 | Bauer et al. | 349/141 |
| 5,852,485 A | * | 12/1998 | Shimada et al. | 349/141 |
| 5,859,682 A | | 1/1999 | Kim et al. | 349/124 |
| 5,870,160 A | | 2/1999 | Yanagawa et al. | 349/141 |
| 5,886,762 A | | 3/1999 | Lee et al. | 349/141 |
| 5,907,380 A | | 5/1999 | Lien | 349/141 |
| 5,910,271 A | | 6/1999 | Ohe et al. | 349/141 |
| 5,914,762 A | | 6/1999 | Lee et al. | 349/141 |
| 5,914,764 A | | 6/1999 | Lee et al. | 349/141 |
| 5,926,161 A | | 7/1999 | Furuhashi et al. | 345/100 |
| 5,946,060 A | | 8/1999 | Nishiki et al. | 349/48 |
| 5,946,066 A | | 8/1999 | Lee et al. | 349/141 |
| 5,946,067 A | | 8/1999 | Kim et al. | 349/141 |
| 5,953,092 A | * | 9/1999 | Sung et al. | 349/143 |
| 5,956,111 A | | 9/1999 | Ohta et al. | 349/141 |
| 5,959,708 A | | 9/1999 | Lee et al. | 349/143 |
| 5,969,782 A | | 10/1999 | Lee et al. | 349/141 |
| 5,977,562 A | | 11/1999 | Hirakata et al. | 349/141 |
| 5,995,186 A | | 11/1999 | Hiroshi | 349/141 |
| 6,005,650 A | | 12/1999 | Kim et al. | 349/141 |
| 6,040,887 A | | 3/2000 | Matsuyama et al. | 349/141 |
| 6,091,473 A | | 7/2000 | Hebiguchi | 349/141 |
| 6,111,627 A | * | 8/2000 | Kim et al. | 349/141 |

FOREIGN PATENT DOCUMENTS

| | | | | |
|---|---|---|---|---|
| JP | 58-2872 | * | 1/1983 | |
| JP | 59014056 | | 1/1984 | |
| JP | 60-158421 | | 8/1985 | |
| JP | 62-078532 | | 4/1987 | |
| JP | 4-67127 | | 3/1992 | |
| JP | 06-160878 | | 6/1994 | |
| JP | 06-273803 | | 9/1994 | |
| JP | 7036058 | | 2/1995 | G02F/1/136 |
| JP | 7-134301 | | 5/1995 | |
| JP | 7-225388 | | 8/1995 | |
| JP | 8-62586 | | 1/1996 | |
| JP | 8-62586 | | 3/1996 | |
| JP | 9-5763 | | 1/1997 | |
| JP | 9-43589 | | 1/1997 | |
| JP | 9-33946 | | 2/1997 | |
| JP | 9-43590 | | 2/1997 | |
| JP | 9-101538 | | 4/1997 | |
| JP | 9-105908 | | 4/1997 | |
| JP | 9-105918 | | 4/1997 | |
| JP | 9-5764 | | 10/1997 | |
| JP | 9-5793 | | 10/1997 | |
| JP | 9-258269 | | 10/1997 | |
| JP | 9-269507 | | 10/1997 | |
| JP | 09325346 | | 12/1997 | |
| JP | 10-319436 | | 12/1998 | |
| JP | 8211411 | | 7/1999 | |
| KR | 96-32049 | | 9/1996 | |
| KR | 97-22458 | | 5/1997 | |
| KR | 98-40330 | | 8/1998 | |
| WO | WO97/10530 | | 3/1997 | |
| WO | WO9710530 | | 3/1997 | |

OTHER PUBLICATIONS

Asia Display '95, "*Principles and Characteristics of Electro–Optical Behavior with In–Plane Switching Mode,*" M. Oh–e, M. Ohta, S. Aratani and K. Kondo, pp:577–580.

Asia Display '98, "*High–Transmittance, Wide–Viewing–Angle Nematic Liquid Crystal Display Controlled by Fringe–Field Switching,*" S.H. Lee, S.L. Lee and H. Y. Kim, pp:371–374.

* cited by examiner

HYBRID SWITCHING MODE LIQUID CRYSTAL DISPLAY DEVICE

This application claims the benefit of Korean Application Nos. 1997-45836 filed on Sep. 4, 1997, 1997-45837 filed on Sep. 4, 1997, and 1998-8736 filed on Mar. 16, 1998, which are hereby incorporated by reference.

BACKGROUND OF THE INVENTION

1. Field of the Invention

The present invention relates to a liquid crystal display device (LCD), and more particularly to a hybrid switching mode LCD.

2. Discussion of the Related Art

In a thin film transistor liquid crystal display device (TFT LCD), while it is desirable and required to make a large scale LCD, a problem exists in that the contrast ratio thereof changes according to a viewing angle. In order to solve this problem, various LCDs, such as twisted-nematic (TN) LCD including an optical compensation film and multi-domain LCD have been introduced. In these LCDs, however, problems still exist in that a contrast ratio is decreased and a color shift is generated according to a viewing angle.

For realizing a wide viewing angle, an in-plane switching mode liquid crystal display device (IPS LCD) is also being proposed.

FIG. 1A is a plan view of a conventional IPS LCD. The IPS LCD comprises a data bus line 1 and a gate bus line 2 which are arranged on a first substrate to define a pixel region. A common bus line 5 is arranged parallel to the gate bus line 2. A TFT is positioned at a crossing area of the data bus line 1 and the gate bus line 2. Data electrodes 19 and common electrodes 11 are arranged parallel to the data bus line 1.

FIG. 1B is a sectional view taken along the line I—I of FIG. 1A. As shown in FIG. 1B, the TFT comprises a gate electrode 10 which is connected to the gate bus line 2 on the first substrate 3, a gate insulator 13 including $SiN_x$ or $SiO_x$ deposited on the gate electrode 10, an amorphous silicon (a-Si) layer 15 formed on the gate insulator 13, a $n^+$ a-Si layer 16 formed on the a-Si layer 15, and source/drain electrodes 17, 18 formed on the $n^+$ a-Si layer 16, which are respectively connected to the data bus line 1 and data electrode 19. The common electrode 11 in the pixel is connected with the common bus line 5 on the first substrate, and the data electrode 19 is connected with the drain electrode 18 of the TFT on the gate insulator 13. On the TFT, data electrodes 19, and gate insulator 13, a passivation layer 20 including $SiN_x$ or $SiO_x$ is deposited over the substrate, and a first alignment layer (not shown in the figure) is formed thereon and alignment direction is determined.

Further, on a second substrate 4, a light shielding layer 6 preventing light leakage, a color filter layer 7 having color filter elements of R, G, and B, and an overcoat layer 8 are formed in order.

In such conventional IPS LCD, however, there are voltage losses by the passivation layer between the data electrodes and the common electrodes and the gate insulator. Therefore, in order to drive liquid crystal molecules smoothly, a high voltage should be applied to the LC layer. Moreover, because the electrodes are formed on one substrate, such defects as cross talk and residual image occur. Also, because the common electrode is made with the same material as the gate electrode, for example, an opaque metal such as Cr, Ta, and the like, its transmittance ratio decreases.

SUMMARY OF THE INVENTION

Accordingly, the present invention is directed to a hybrid switching mode liquid crystal display device that substantially obviates one or more of the problems due to limitations and disadvantages of the related art.

An object of the present invention is to provide a hybrid switching mode LCD having a low driving voltage of an LC layer.

Another object of the present invention is to provide a hybrid switching mode LCD where at least a pair of electrodes which apply an in-plane and inclined electric field are formed on upper and lower substrates, respectively.

Another object of the present invention is to form transparent electrodes on one side of the substrate and improve the aperture ratio of the LCD.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, the present invention provides a hybrid switching mode LCD (HS mode LCD) comprising a first substrate, forming at least a pair of electrodes applying an in-plane electric field, and a second substrate corresponding to the first substrate, forming a group of electrodes corresponding to the electrodes, so that a perpendicular and an inclined electric fields are applied between the substrates, and the driving voltage of an LC layer decreases.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding the invention and are incorporated in and constitute a part of this application, illustrate embodiments of the inventing and together with the description serve to explain the principle of the invention.

In the drawings.

DETAILED DESCRIPTION OF THE PREFERRED EMBODIMENTS

An HS mode LCD of the present invention comprises a gate electrode connected to a gate bus line on a first substrate, a gate insulator on the gate electrode, an a-Si layer formed on the gate insulator, an $n^+$ a-Si layer formed on the a-Si layer, and source/drain electrodes formed on the $n^+$ a-Si layer, which are respectively connected to the data bus line and data electrode. The data electrodes are formed on the gate insulator and connected to the drain electrode of the TFT. On the TFT, a passivation layer is deposited, and a first alignment layer is formed over the first substrate and alignment direction thereof is determined.

On a second substrate corresponding to the first substrate, a light shielding layer is formed to prevent the light leakage at the TFT, the gate bus line, an adjacent data bus line nearby, a color filter layer, and an overcoat layer are formed. A plurality of common electrodes corresponding to the data electrodes is formed on the region of substrate forming the light shield layer and the pixel region. Subsequently, a second alignment layer is formed and liquid crystal materials are injected between two substrates.

Another HS mode LCD of the present invention comprises a gate electrode connected to a gate bus line on a first substrate, a gate insulator deposited on the gate electrode, an a-Si layer formed on the gate insulator, an $n^+$ a-Si layer formed on the a-Si layer, and source/drain electrode ford on the $n^+$ a-Si layer, the source/drain electrodes are restively connected to the data bus line and data electrode. First common electrodes in a pixel region are formed on the first substrate and connected to a common bus line, and the data electrodes are formed on the gate insulator and connected to the drain electrode of the TFT. On the TFT, a passivation layer is deposited, and a first alignment layer is formed over the fist substrate and alignment direction thereof is determined.

On the second substrate corresponding the first substrate, a light shielding layer to prevent the light leakage of the TFT, the gate bus line, the data bus lines and the common bus line nearby, a color filter layer and an overcoat layer are formed thereon. A second common electrode is formed on a region of substrate forming the light shielding layer. In the pixel region, second common electrodes are formed to correspond to the data electrodes. Subsequently, a second alignment layer is formed and liquid crystal materials are injected between two substrates.

As a modification of the present invention, the common electrode formed on the light shielding layer may be formed as one body with the light shielding layer to function as a light shield.

Hereinafter, the HS mode LCD of the present invention is explained in detail with reference to the accompanying drawings.

Figure 1A:
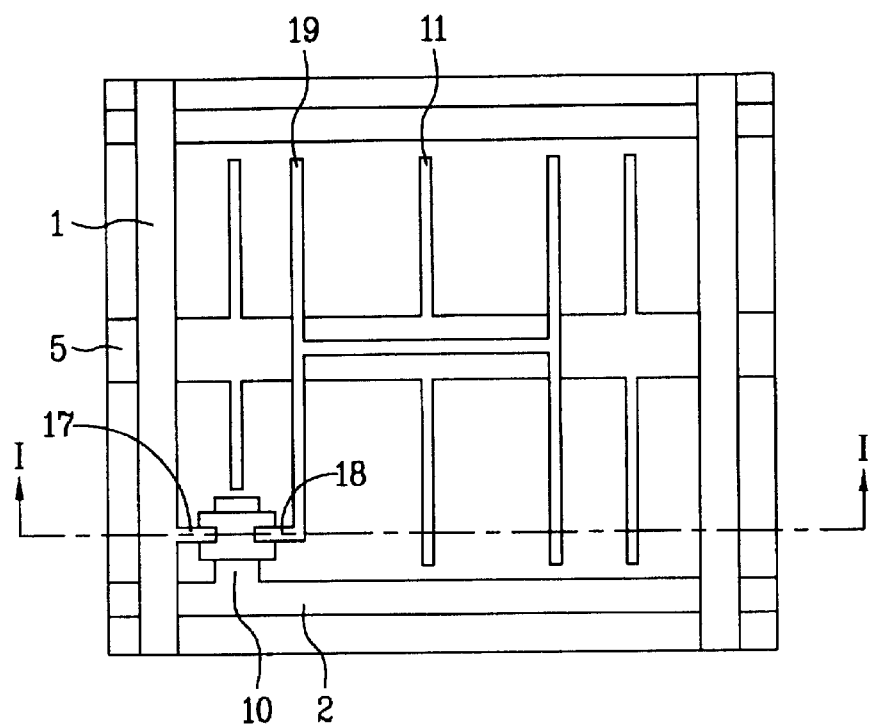
FIGS. 1A to 1B are views showing a conventional IPS LCD.
Figure 1B:
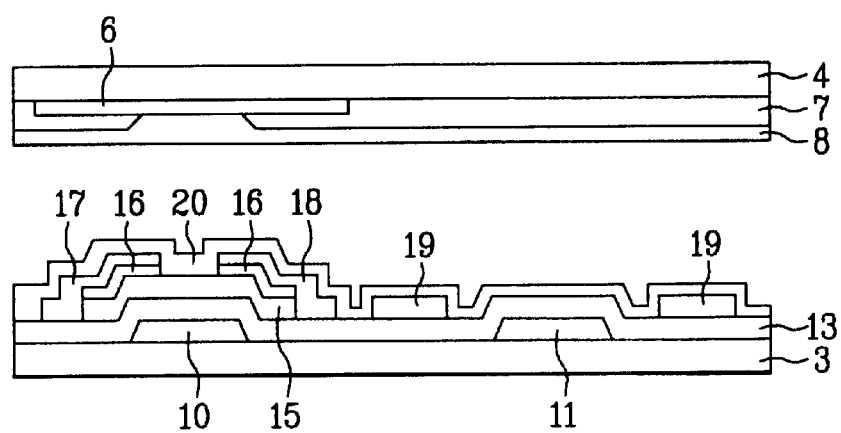
Figure 2A:
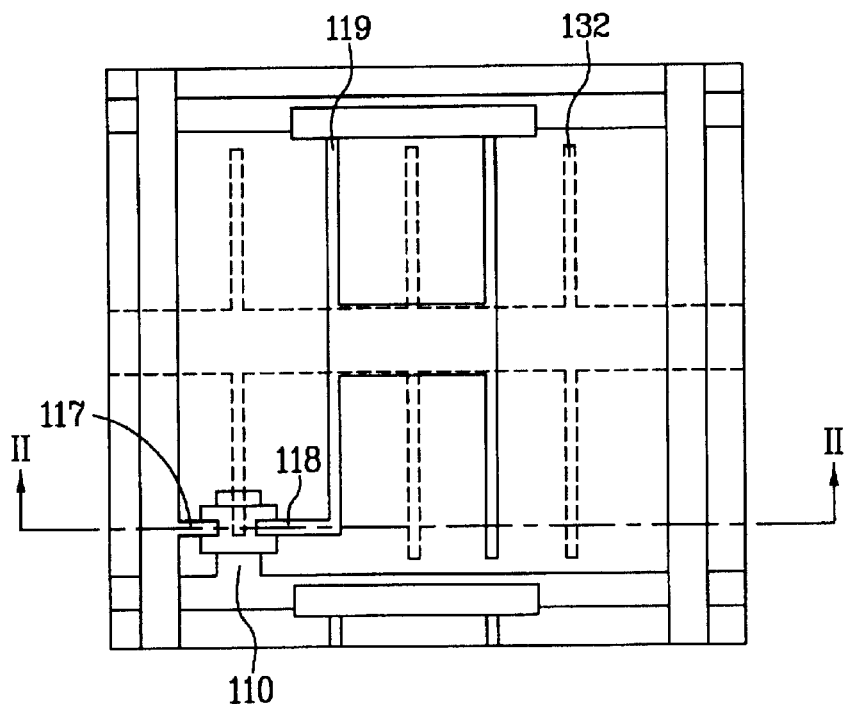
FIGS. 2A to 2B are views showing a first embodiment of the present invention.
Figure 2B:
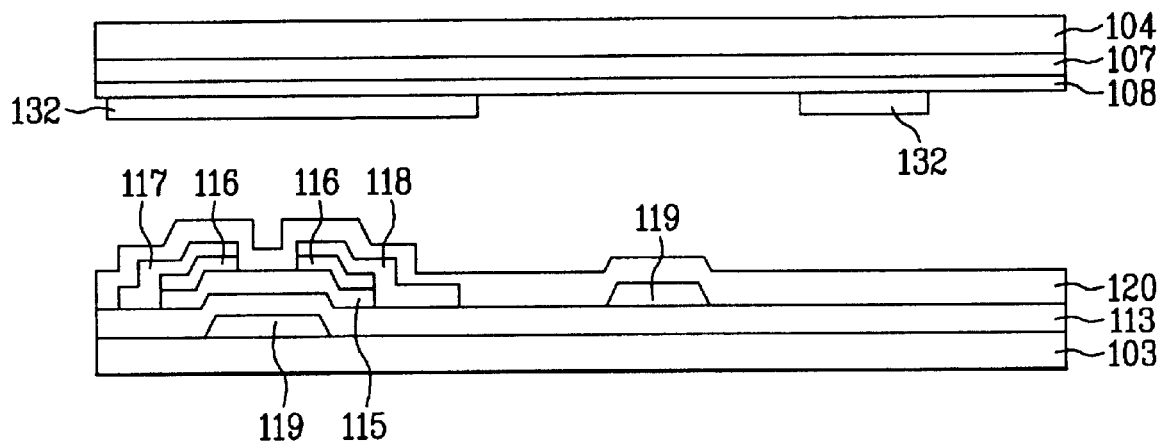

FIG. 2A is a plan view showing a first embodiment of the present invention, FIG. 2B is a sectional view taken along the line II—II of FIG. 2A.

The present LCD comprises a gate electrode 110 including an opaque metal such as Ta, Cr, Al and connected to a gate bus line on a first substrate 103, a gate insulator 113 including $SiN_x$ or $SiO_x$ deposited on the gate electrode 110, an a-Si layer 115 formed on the gate insulator 113, an $n^+$ a-Si layer 116 formed on the a-Si layer 115, and source/drain electrodes 117, 118 formed on the $n^+$ a-Si layer 116, which are respectively connected to the data bus line and data electrode 119. The data electrodes 119 cover a part of the adjacent gate bus line, which forms a storage capacitor.

On the TFT, a passivation layer 120 including $SiN_x$ or $SiO_x$ is deposited, and a first alignment layer (not shown in the figure) is formed all over the first substrate 103 and alignment direction thereof is determined.

FIG. 2B shows the first embodiment. Referring to FIG. 2B, on the second substrate 104, a color filter layer 107 and an over-coat layer 108 are formed in order. A light shielding electrode 132 including Cr or $CrO_x$ to prevent light leakage at the TFT, the gate bus line, and the data bus line nearby is formed thereon. In the pixel region, a plurality of other light shielding electrodes including ITO is formed. Subsequently, a second alignment layer (not shown in the figure) is formed and liquid crystal materials are injected between the two substrates.

The first embodiment of the present invention uses up/down electric field in the light shielding layer region and inclined electric field between the common electrodes and the data electrodes. As a result, the present invention decreases the driving voltage of the LC layer by about 0.5~1 volt, and also decreases the residual current which causes the residual image in the conventional IPS LCD. Moreover, as compared with the conventional IPS LCD, the driving voltage is lower and the aperture ratio is improved by about 20~30%.

Figure 3A:
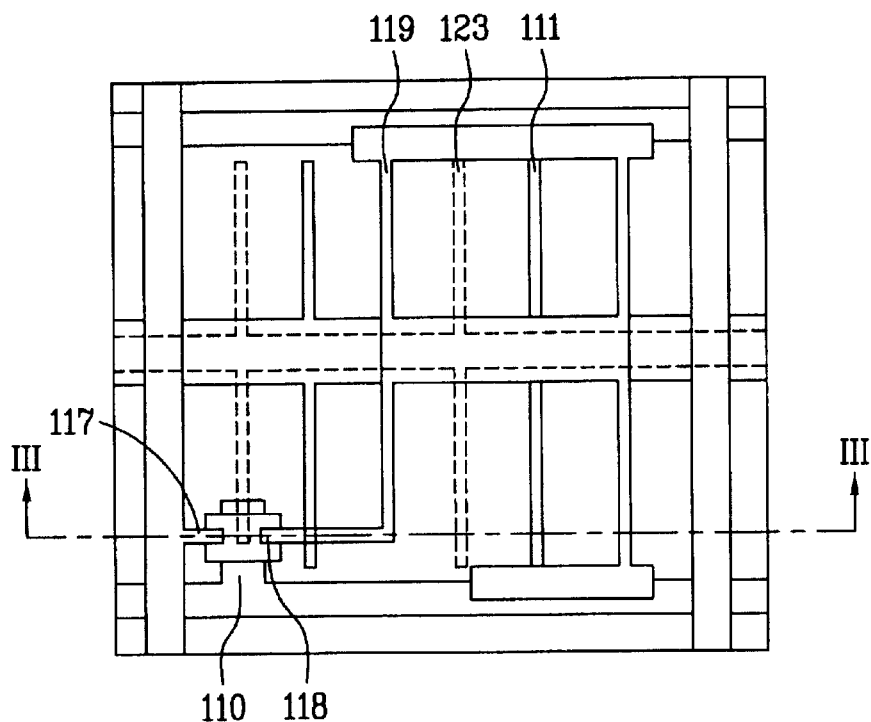
FIGS. 3A to 3C are views showing second and third embodiments of the present invention.
Figure 3B:
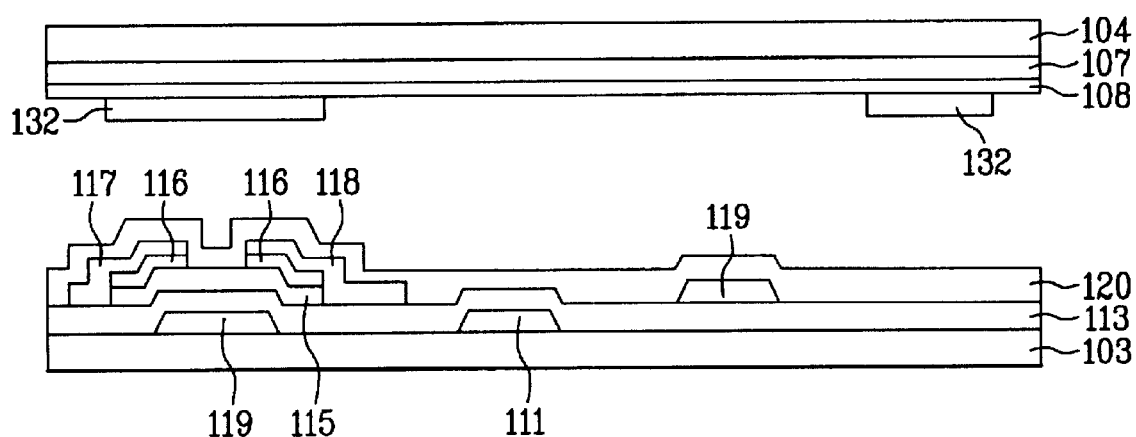
Figure 3C:
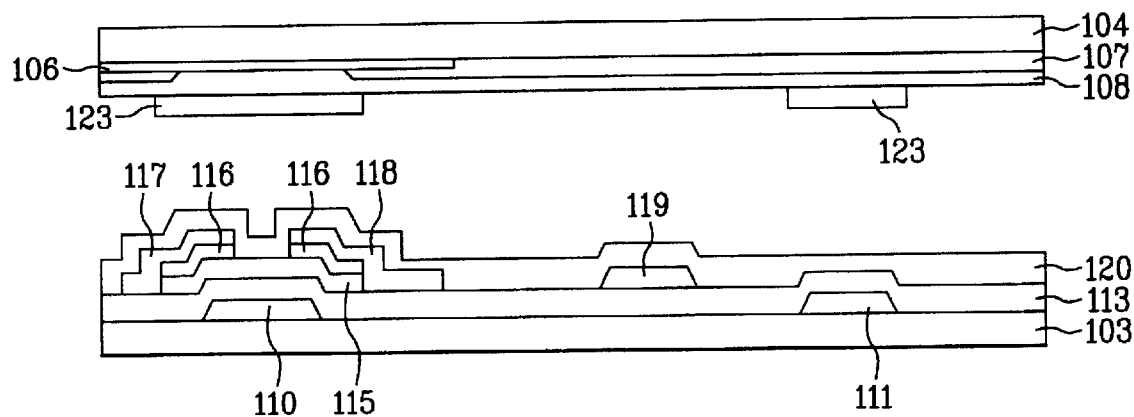

FIG. 3A is a plan view showing a second embodiment of the present invention. FIG. 3B is a sectional view taken along the line III—III of FIG. 3A, and FIG. 3C is a sectional view showing a third embodiment of the present invention.

The LCD of the third embodiment of the present invention comprises a gate electrode 110 including an opaque metal such as Ta, Cr, Al and connected to a gate bus line on a first substrate 103. A gate insulator 113 including $SiN_x$ or $SiO_x$ is deposited on the gate electrode 110. An a-Si layer 115 is formed on the gate insulator 113, and an $n^+$ a-Si layer 116 is formed on the a-Si layer 115. Source/drain electrodes 117, 118 are formed on the $n^+$ a-Si layer 116, which are respectively connected to the data bus line and data electrode 119.

First common electrodes 111 in the pixel are connected to the common bus line on the first substrate 103, and the data electrodes 119 are connected to the drain electrode 118 of the TFT on the gate insulator 113. On the TFT, a passivation layer 120 including $SiN_x$ or $SiO_x$ is deposited, and a first alignment layer (not shown in the figure) is formed all over the first substrate 103 and alignment direction is determined. The data electrodes 119 cover a part of the adjacent gate bus line, which forms a storage capacitor.

On the second substrate 104, a light shielding layer 106 including Cr or $CrO_x$ is formed to prevent light leakage at the TFT, the gate bus line, the data bus line, and the common bus line. A color filter layer 107 and an overcoat layer 108 are formed thereon. A second common electrode 123 including ITO is formed on a region of substrate forming the light shielding layer 106. In the pixel region, second common electrodes 123 including ITO are formed to correspond to the data electrodes 119. At this time, the second common electrodes 123 in the pixel region, as shown in FIGS. 3A and 3B, are preferably formed in the region of the second substrate 104 corresponding to the region between the adjacent data electrodes 119 in the first substrate 103. As a result, the second common electrodes 123 forms a hybrid electric field with the data electrodes 119 of the first substrate 103. Subsequently, a second alignment layer (not shown in the figure) is formed and liquid crystal materials are injected between two substrates.

In the FIG. 3C, the third embodiment of the present invention is shown. In the third embodiment, at least one of the second common electrodes is formed in a region corresponding to a region of the first common electrodes, and other structures are same as the second embodiment.

Furthermore, similar to the second embodiment, and as a modification of the second and third embodiments, the second common electrode may be formed from an opaque material such as Cr or $CrO_x$ to act as the light shield layer as well. Thus, in such a modification, a light shielding layer 106 is not necessary.

In the above embodiments of the present invention, the alignment directions of the first and second alignment layers may be determined by forming an alignment layer including polyimide based material and rubbing thereon, or by irradiating a light on an photo-alignment layer including PVCN (polyvinylcinnamate) or PSCN (polysiloxanecinnamate) based material. At this time, the light-irradiation may be performed one or more times using a polarized or an unpolarized light.

Figure 4:
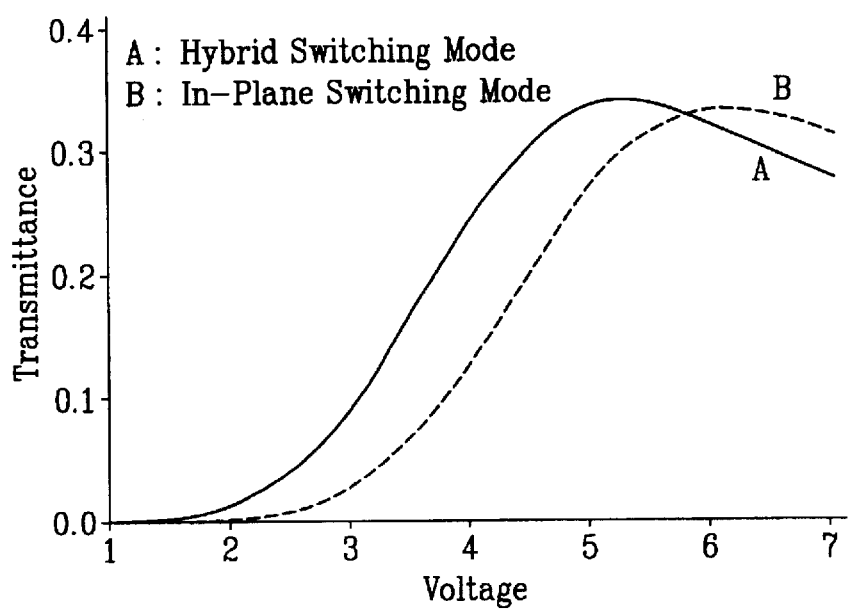
FIG. 4 is a view showing an electro-optical characteristic of the conventional IPS mode LCD and the present HS mode LCD.

FIG. 4 is a view showing an electro-optical characteristic of the IPS mode LCD and the HS mode LCD of the present invention. As shown in FIG. 4, the present HS mode LCD decreases the driving voltage by about 0.5~1 Volt and increases the transmittance ratio by about 10~20% as compared to the IPS LCD.

Therefore, the present HS mode LCD can decrease the driving voltage of an LC layer using a plurality of electrodes that form a hybrid electric field. The present HS mode LCD eliminates cross talk and residual image by the plurality of electrodes formed separately on two substrates. Moreover, light transmittance ratio is increased by the electrodes which are made from transparent materials. The following represents brightness, response time according to gray level, and contrast ratio according to left-right and up-down viewing angle, which show the improvement resulted from the present invention.

TABLE 2

Gray Level & Response Time

| GRAY | tr | tf | tr + tf |
|---|---|---|---|
| 7 | 98 | 38 | 136 |
| 15 | 90 | 41 | 131 |
| 23 | 95 | 40 | 135 |
| 31 | 94 | 42 | 136 |
| 39 | 87 | 39 | 126 |
| 47 | 78 | 40 | 118 |
| 55 | 59 | 43 | 102 |
| 63 | 30 | 44 | 74 |

TABLE 1

Gray Level & Brightness

| GRAY | 63 | 59 | 55 | 51 | 47 | 43 | 39 | 35 | 31 | 27 | 23 | 19 | 15 | 11 | 7 | 3 | 0 |
|---|---|---|---|---|---|---|---|---|---|---|---|---|---|---|---|---|---|
| BRIGHTNESS | 65.40 | 55.60 | 50.40 | 39.80 | 32.90 | 27.90 | 23.50 | 21.10 | 16.90 | 13.70 | 11.30 | 8.80 | 6.71 | 4.83 | 3.18 | 1.69 | 0.35 |

TABLE 3

Left-Right Viewing Angle & Contrast Ratio

| VIEWING ANGLE | LEFT | | | | | | | | | FRONT |
|---|---|---|---|---|---|---|---|---|---|---|
| ANGLE | 70 | 65 | 60 | 55 | 50 | 45 | 40 | 30 | 20 | 10 | 0 |
| CONTRAST RATIO | 20.3 | 25.4 | 34.3 | 49.0 | 65.0 | 76.0 | 72.6 | 97.5 | 164.0 | 187.0 | 187.0 |

| VIEWING ANGLE | RIGHT | | | | | | | | | |
|---|---|---|---|---|---|---|---|---|---|---|
| ANGLE | 10 | 20 | 30 | 40 | 45 | 50 | 55 | 60 | 65 | 70 |
| CONTRAST RATIO | 188.0 | 172.0 | 104.4 | 81.2 | 76.0 | 66.7 | 49.7 | 36.8 | 25.7 | 19.5 |

TABLE 4

Up-Down Viewing Angle & Contrast Ratio

| VIEWING ANGLE | UP | | | | | | | | | FRONT |
|---|---|---|---|---|---|---|---|---|---|---|
| ANGLE | 70 | 65 | 60 | 55 | 50 | 45 | 40 | 30 | 20 | 10 | 0 |
| CONTRAST RATIO | 16.1 | 19.4 | 23.8 | 27.3 | 29.8 | 32.2 | 40.0 | 71.0 | 108.0 | 150.0 | 188.0 |

| VIEWING ANGLE | DOWN | | | | | | | | | |
|---|---|---|---|---|---|---|---|---|---|---|
| ANGLE | 10 | 20 | 30 | 40 | 45 | 50 | 55 | 60 | 65 | 70 |
| CONTRAST RATIO | 193.0 | 143.0 | 88.8 | 42.3 | 32.6 | 28.6 | 25.1 | 19.8 | 15.8 | 12.8 |

Accordingly, in the present invention, a hybrid switching mode LCD includes a pair of electrodes formed on upper and lower substrates, respectively, and two electrodes formed on one substrate and a common electrode formed on the other substrate.

It will be apparent to those skilled in the art that various modification and variations can be made in a hybrid switching mode liquid crystal display device of the present invention without departing from the spirit or scope of the inventions. Thus, it is intended that the present invention cover the modifications and variations of this invention provided they come within the scope of the appended claims and their equivalents.

What is claimed is:

1. A switching mode liquid crystal display (LCD) device formed to generate first and second switched electric field for driving a matrix of LCD elements, said liquid crystal display device comprising:

first and second substrates;

a liquid crystal layer between said first and second substrates;

a pair of first electrodes on said first substrate applying first electric fields in a plane corresponding to said first substrate;

a plurality of second electrodes on said second substrate applying second electric fields between said first and second substrates at an orientation different from said first electric fields, wherein the pair of first electrodes are parallel to the second electrodes and do not overlap the second electrodes; and a pair of first conductive lines intersecting the pair of first electrodes, respectively; and a second conductive line intersecting the second electrode;

wherein said first and second fields are applied concurrently.

2. The switching mode liquid crystal display device according to claim 1, further comprising:

a data bus line arranged in a first direction on said first substrate and a gate bus line arranged in a second direction on said first substrate to define a pixel region;

a thin film transistor positioned at a crossing area of said data bus line and said gate bus line; and a first alignment layer on said first electrodes.

3. The switching mode liquid crystal display device according to claim 2, wherein said first alignment layer includes one of a photosensitive material, a polyimide, and a polyamide.

4. The switching mode liquid crystal display device according to claim 1, wherein said first pairs of electrodes include a data electrode and said second electrodes include a common electrode.

5. The switching mode liquid crystal display device according to claim 1, further comprising:

a light shielding layer on said second substrate;

a color filter layer on said light shielding layer; and a second alignment layer on said second electrodes.

6. The switching mode liquid crystal display device according to claim 5, further comprising an overcoat layer on said color filter layer.

7. The switching mode liquid crystal display device according to claim 5, wherein said second alignment layer includes one of photosensitive material, polyimide and polyamide.

8. The switching mode liquid crystal display device according to claim 1, wherein one electrode of a plurality of said second electrodes is in a region of said light shielding layer.

9. The switching mode liquid crystal display device according to claim 1, wherein a plurality of said second electrodes includes ITO (indium tin oxide).

10. The switching mode liquid crystal display device according to claim 1, further comprising:

a color filter layer on said second substrate;

light shielding electrodes on said color filter layer; and a second alignment layer on said light shielding electrodes.

11. The switching mode liquid crystal display device according to claim 10, further comprising an overcoat layer on said color filter layer.

12. The switching mode liquid crystal display device according to claim 10, wherein said light shielding electrodes include common electrodes.

13. The switching mode liquid crystal display device according to claim 10, wherein said second alignment layer includes one of a photosensitive material, polyimide and polyamide.

14. A switching mode liquid crystal display (LCD) device formed to generate first and second switched electric field for driving a matrix of LCD elements, said liquid crystal display device comprising:

first and second substrates;

a liquid crystal layer between said first and second substrates;

a plurality of first electrodes and a plurality of second electrodes at a first side of said liquid crystal layer for applying first electric fields in a plane corresponding to said first substrate;

a plurality of third electrodes at second side of said liquid crystal layer for applying second electric fields between said first and second substrates at an orientation different from said first electric fields, wherein the second electrodes are parallel to the third electrodes and do not overlap the third electrodes; and a first conductive line intersecting the first electrodes;

a second conductive line intersecting the second electrodes; and a third conductive line intersecting the third electrodes;

wherein said first and second electric fields are applied concurrently.

15. The switching mode liquid crystal display device according to claim 14, further comprising:

a data bus line arranged in a first direction on said first substrate and a gate bus line arranged in a second direction on said first substrate to define a pixel region;

a common bus line arranged in said pixel region;

a thin film transistor positioned at a crossing area of said data bus line and said gate bus line; and a first alignment layer on said first substrate.

16. The switching mode liquid crystal display device according to claim 15, wherein the first alignment layer includes one of a photosensitive material, polyimide, and polyamide.

17. The switching mode liquid crystal display device according to claim 14, wherein the plurality of third electrodes includes a plurality of common electrodes.

18. The switching mode liquid crystal display device according to claim 17, wherein the plurality of said common electrodes include ITO (indium tin oxide).

19. The switching mode liquid crystal display device according to claim 17, wherein the third electrodes are in the pixel region are in a region of the second substrate corresponding to a region of the second electrodes on the first substrate.

20. The switching mode liquid crystal display device according to claim 14, wherein one electrode of a plurality of said third electrodes is in a region of said light shielding layer.

21. The switching mode liquid crystal display device according to claim 14, wherein at least one of a plurality of said third electrodes is in said pixel region.

22. The switching mode liquid crystal display device according to claim 21, wherein said third electrode in said pixel region is in a region of said second substrate corresponding to a region between the adjacent first electrodes on said first substrate.

23. The switching mode liquid crystal display device according to claim 14, wherein the third electrode in the pixel region is in a region of the second substrate corresponding to a region of the second electrodes on the first substrate.

24. The switching mode liquid crystal display device according to claim 14, wherein said plurality of first electrodes includes data electrodes and said plurality of second electrodes includes common electrodes.

25. The switching mode liquid crystal display device according to claim 14, further comprising:
    a light shielding layer on said second substrate;
    a color filter layer on said light shielding layer, and
    second alignment layer on said second substrate.

26. The switching mode liquid crystal display device according to claim 25, further comprising an overcoat layer on said color filter layer.

27. The switching mode liquid crystal display device according to claim 25, wherein the second alignment layer includes one of a photosensitive material, polyimide, and polyamide.

28. A switching mode liquid crystal display (LCD) device formed to generate first and second switched electric fields for driving a matrix of LCD elements, said liquid crystal display device comprising:
    first and second substrates;
    a liquid crystal layer between said first and second substrates;
    a plurality of data electrodes and a plurality of first common electrodes on said first substrate for applying first electric fields in a plane corresponding to said first substrate;
    a plurality of second common electrodes on said second substrate for applying second electric fields between said first and second substrates at an orientation different from said first electric fields, wherein the second common electrodes are parallel to the first common electrodes and do not overlap the first common electrodes; and
    a first conductive line intersecting the first common electrodes; and
    a second conductive line intersecting the second common electrodes;
    wherein said first and second electric fields are applied concurrently.

29. The switching mode liquid crystal display device according to claim 28, further comprising:
    a data bus line arranged in a first direction on said first substrate and a gate bus line arranged in a second direction on said first substrate to define a pixel region;
    a common bus line arranged in said pixel region;
    a thin film transistor positioned at a crossing area of said data bus line and said gate bus line, and
    a first alignment layer over a plurality of said data electrodes and common electrodes.

30. The switching mode liquid crystal display device according to claim 29, wherein at least one of said first and second alignment layers includes one of a photosensitive material, polyimide, and polyamide.

31. The switching mode liquid crystal display device according to claim 28, further comprising:
    a light shielding layer on said second substrate;
    a color filter layer on said light shielding layer; and
    a second alignment layer on a plurality of said second common electrodes.

32. The switching mode liquid crystal display device according to claim 31, wherein at least one of said first and second alignment layers includes one of a photosensitive material, polyimide, and polyamide.

33. The switching mode liquid crystal display device according to claim 30, further comprising an overcoat layer on said color filter layer.

34. The switching mode liquid crystal display device according to claim 28, wherein a plurality of said second common electrodes includes ITO (indium tin oxide).

35. The switching mode liquid crystal display device according to claim 28, wherein one electrode of a plurality of said second common electrodes is in a region of said light shielding layer.

36. The switching mode liquid crystal display device according to claim 28, wherein one electrode of a plurality of said second common electrodes is formed in a region corresponding to a region of said first common electrodes.

* * * * *